United States Patent

[11] 3,590,985

[72] Inventor Jerome Hirsch
1931 N.E. 187 Drive, North Miami Beach, Fla. 33162
[21] Appl. No. 824,558
[22] Filed May 14, 1969
[45] Patented July 6, 1971

[54] AXIALLY ROTATABLE DELIVERY CONVEYOR
9 Claims, 9 Drawing Figs.

[52] U.S. Cl. .................................................. 198/213
[51] Int. Cl. ................................................ B65g 33/00
[50] Field of Search .......................................... 198/213, 108

[56] References Cited
UNITED STATES PATENTS
3,148,765  9/1964  Weiss ............................ 198/213
3,178,010  4/1965  Van Keuren .................. 198/108
3,196,772  7/1965  Sickles ......................... 198/213

Primary Examiner—Richard E. Aegerter
Attorney—John Cyril Malloy

ABSTRACT: An axially rotatable delivery conveyor including interconnected straight lengths and curved lengths in which the lengths include an inner core and an outer core having a cylindrical surface coaxial with respect to the axis of rotation of the delivery conveyor and in which outer cylindrical surface a spiral track is provided of an area substantially less than the outer surface so that the conveyor is adapted to be supported by bearing means engaging the smooth outer surface on rotation of the conveyor to travel hooklike articles having a bight portion engaged in the spiral track; the curved lengths include a flexible inner core and the outer cylindrical surface is composed of interconnected links having an outer surface similar to that of the straight lengths, that is, cocylindrical and including the spiral track.

PATENTED JUL 6 1971

INVENTOR.
JEROME HIRSCH
BY John Cyril Malloy
ATTORNEY.

PATENTED JUL 6 1971 3,590,985
SHEET 2 OF 2
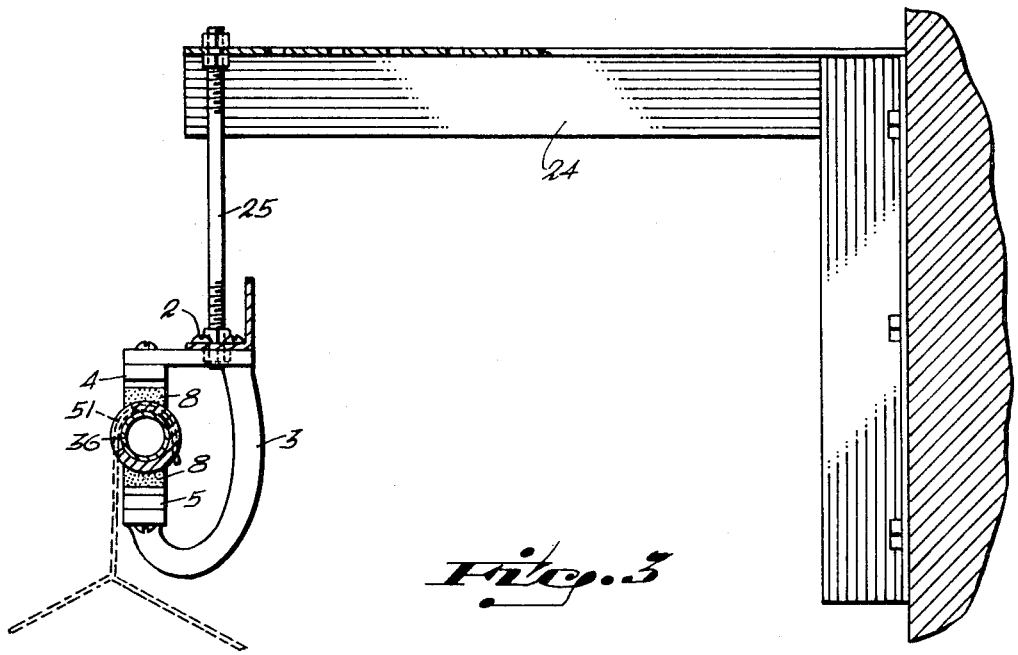
Fig.3
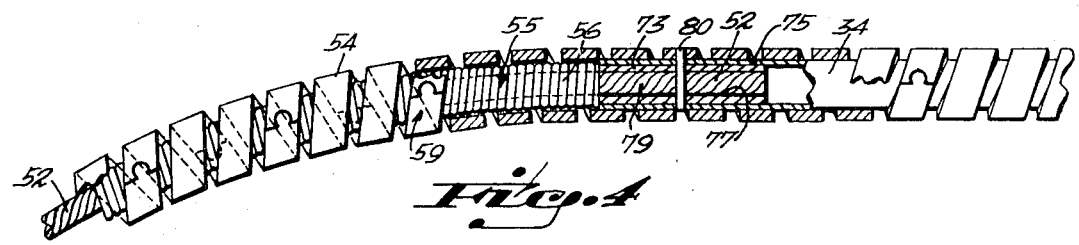
Fig.4
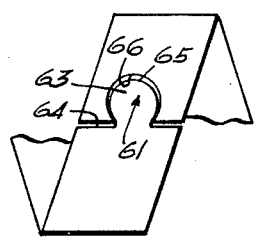 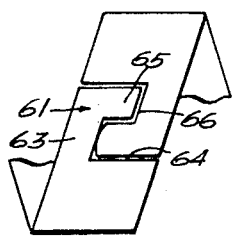 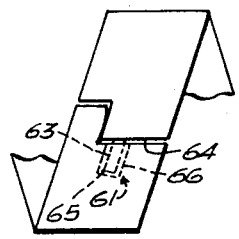 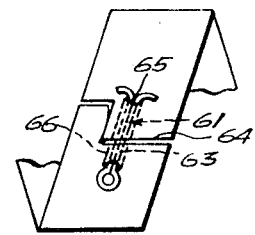
Fig.5   Fig.6   Fig.7   Fig.8
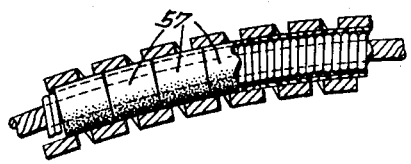
Fig.9
INVENTOR.
JEROME HIRSCH
BY John Cyril Malloy
ATTORNEY

AXIALLY ROTATABLE DELIVERY CONVEYOR

In the past, it has been known to travel load-bearing hooks along a conveyor of interconnected straight and curved lengths supported by bearing means in which the outer surface is provided with a spiral guide, such as a spiral spring; however, such an outer surface is not adapted to be supported by a bearing without undue wear since the outer surface of the spiral spring wears unevenly on the bearing surfaces since the individual convolutions are not of a substantial axial length, i.e. the main axial surface is recessed and the outermost surface generated on rotation of the conveyor is not substantially smooth or continuous. Exemplary of this type of conveyor is that disclosed in U.S. Pat. No. 3,178,010. Efforts have been made to solve this problem, such as the hammered spiral track in the surface of a generally cylindrical conveyor means, such as that disclosed in U.S. Pat. No. 3,148,765; however, the hammered track does not provide the preferred substantially radially or depthwise extending push face of the guide track, but rather spiral track walls which as seen in cross section are V-shaped instead of the push face of the track being steep and substantially at an angle of at least about 90° to the main surface of the conveyor. In the last mentioned patent, as a result, the degree of incline as on travel between a final level and a second level, which can be traversed by a laden hook is limited to a relatively small grade at a vertical bend in contrast to that which results from the substantially radially extending leading spiral track face of the instant invention, i.e., the vertical track face in FIG. 2 of the instant invention, which is constructed in a novel manner to be described. In short, a relatively steep track face to push the hooks is required in order that a steep grade can be traversed; otherwise the hooks will tend to wend their way out of the guide track and cause a jambup and other deleterious operational difficulty.

In the past, there have also been various types of curved lengths for such conveyors, and this invention discloses an improved direction changing means or curved lengths for such a conveyor which is characterized by interconnected separate links each of which are adapted on rotation of the conveyor about the axis of rotation to travel a laden hook along an axially extending spiral track in its generally smooth outer cylindrical conveyor surface which is coterminous and coaxial with the straight lengths as well as so as to travel the hooks of lading along both the straight and curved lengths in a smooth path of travel.

It is, accordingly, an object of this invention to provide an improved, novel structure for straight lengths of an axially rotatable delivery conveyor; it is also an object of this invention to provide an improved, curved length for an axially rotatable delivery conveyor; and it is another object of this invention to provide an improved axially rotatable delivery conveyor which includes interconnected straight conveyor lengths and curved conveyor lengths of the type described herein.

It is a general object of this invention to provide an improved, axially rotatable delivery conveyor system and elements for the system which are inexpensive to manufacture, simple in construction, readily assembled, and adapted to travel articles on laden hooks engaged in a spiral track along the conveyor elements between two points.

In accordance with these and other objects which will become apparent hereinafter, the instant invention will now be described with reference to the accompanying drawings in which:

FIG. 3 is a view in cross section taken along the plane indicated by the line 3-3 of FIG. 2 and looking in the direction of the arrows;

FIG. 4 is a view in cross section taken along that portion of FIG. 1 indicated by the arrowed lines 4-4 and looking in the direction indicated by the arrows;

FIGS. 5, 6, 7, and 8 are enlarged, schematic views illustrating the construction variations shown in FIG. 4; and FIG. 9 is an enlarged view of an alternative embodiment of the construction shown in FIG. 4.

Figure 1:
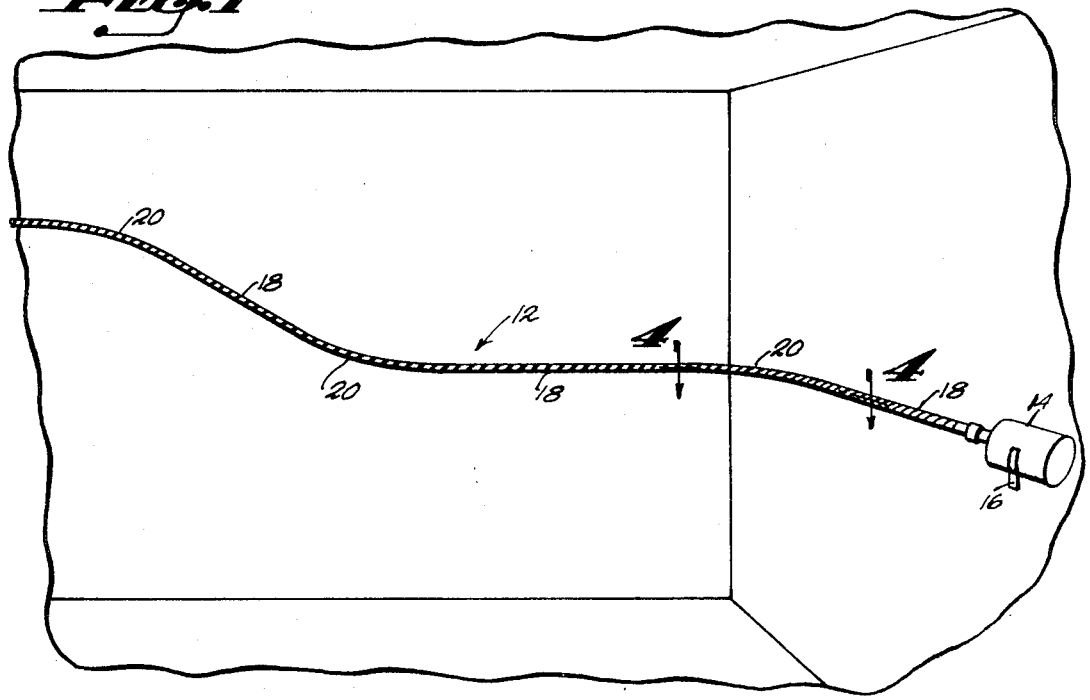
FIG. 1 is a perspective view of a conveyor run.

Referring to the drawings, wherein like reference characters designate like or corresponding parts throughout the several views, and referring particularly to FIG. 1, there is shown generally an axially rotatable delivery conveyor 12 which is adapted to be supported in spaced relation from the surfaces of the installation site in the manner to be described and which, as is customary, includes drive means such as the motor 14 suitably supported as by the bracket 16. The conveyor, as seen in FIG. 1, includes interconnected straight lengths 18 and curved lengths 20 or direction changing means, which lengths are adapted to trace a circuitous single path between a point A and a point B and to be of use in transporting articles suspended by hook means on the conveyor as will be explained.

Figure 2:
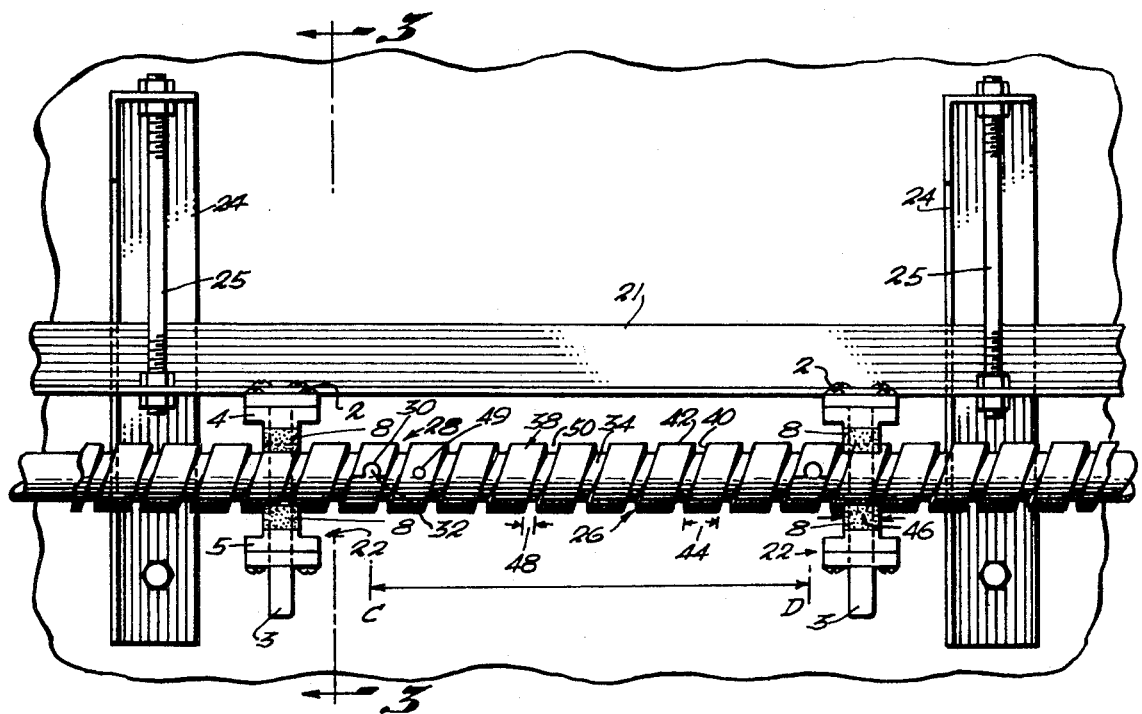
FIG. 2 is a view more in detail and illustrating a portion of the straight length of a conveyor run.

Reference is made to FIGS. 2 and 3 in which it is seen that the conveyor lengths are suspended from a support means which includes a rail 21 provided with spaced, depending bearing means 22 seen also in FIG. 3 and to be described in detail. The rail 21 is suitably mounted to any convenient surface by brackets 24 provided with depending vertical, adjustable, pendant elements 25 or other type hardware adapted to locate the conveyor lengths in the conveyor run.

The bearing means 22, it is seen in FIG. 3, includes means 2 for attachment to the rail and a depending, open-sided or C-shaped bearing holder 3 which includes an opposed upper and lower confronting bearing support portion 4 and 5, each of which are adapted to be provided with a conveyor engaging liner 8 of wear resistant, low friction material and may include adjustable means to adjust the bearing surfaces, which in any event define a saddle or cradle for rotatably embracing the outer, substantially continuous surface of the conveyor means which includes a helical guide track in the surface thereof which is to be described fully in the next following paragraphs.

The straight lengths of the conveyor are preferably of a predetermined length, such as 1-foot lengths, which span the length between, for instance, points C and D in FIG. 2 and one of which straight lengths is designated generally by the numeral 26 in that figure. Each of the straight lengths is provided at the ends thereof with an element of a driving connection means 28 so that the adjacent ends may be connected together to make a straight run of the required length, the connecting means comprising a recess 30 at one end and a companionately shaped protrusion 32 to interengage in the recess of the next adjacent straight length and in hooked-up relation.

The structures of each of the straight lengths is similar in the preferred embodiment and includes an inner core 34 of rigid material such as ordinary pipe or tubing of circular, cylindrical cross section and of a sufficient wall thickness 36 so as to have the required strength to transmit the torque required to move the load expected of the particular installation for which it is designed. Alternatively, the core may be of a solid rod and may be of special material to suit the job site, such as stainless steel, chrome-plated steel, etc. The exterior of each of the straight lengths is provided with article pushing means, or track means, and bearing engaging means, generally designated by the numeral 38, presenting both (a) as the article pushing means or track means a substantially radial face 40 extending radially from the core surface and which appears to advance as a uniform spiral in the direction of travel of the article on appropriate rotation of the conveyor, and (b) as the bearing engaging means, a substantially continuous and cylindrical surface 42 coaxial with respect to the core, which cylindrical surface between the adjacent radial faces, i.e., the aforesaid track means or article pushing means 40, is of sufficient axial length 44 relative to that of the axial length 46 of the bearing surfaces in the saddles and, also, that of the axial span of the spiral track 48 resulting by reason of the radial face, that the area of engagement or area of surface in engagement with the bearing surface of the saddle are at all times in substantial bearing engagement with the cylindrical surface over substantially 50 percent of the axial length 46 of the bearing to prevent uneven wear and to smoothly support the rotatable conveyor. In the preferred embodiment, the article pushing and bearing engaging means 38 comprises a spiral element formed of flat stock which is secured to its associated length of inner core such as by the radial pins 49. The article pushing and bearing means 38, that is, the outer cylindrical surface with the relatively narrow spiral form track in the peripheral surface, is characterized by a rigid article pushing face of a radial depth of about one-fourth of an inch to define a relatively deep spiral track 50 adapted to receive a load-carrying hook 51. The cylindrical outer surface is preferably of an uninterrupted axial length between the intersection of the surface with the track of about one-half inch to three-fourths inch. As is clear from the drawings, the outside diameter of the core is substantially the same as but slightly less than that of the inside diameter of the outer jacketing means 38 having the spiral track of the preferred embodiment and the core is of an outside diameter within the range of about three-fourths of an inch to 1 inch.

The direction changing means 20 for the single run conveyor shown, that is, the curved lengths 20, will now be described with particular reference initially to FIG. 4. The curved lengths are characterized by a flexible inner torque shaft or torque core 52 which is laterally flexible and torsionally rigid which is jacketed by relatively short axial lengths of interconnected links 54 of article pushing and bearing engaging means which are similar to that of the aforesaid straight lengths but each of which is of an axial length of less than about two spiral convolutions.

The torque transmitting inner core of the direction changing lengths preferably includes a filler means 55 intermediate the confronting longitudinal surfaces of the inner core and the links of the article pushing and bearing means. As seen in FIG. 4, the filler means may constitute a helical wound spring 56 of an advancing convolution orientation such that, as the conveyor is driven by the motor to advance the spiral article-engaging face 40, the windings tend to tighten. The inside diameter of the spring 56 defines a column of a diameter slightly larger than that of the preferred multistrand, helically wound flexible cable core 52 and the outside outer diameter of the filler means 56 of the embodiment of FIG. 4 is slightly less than that of the inner surface of the article pushing and bearing engaging means to accommodate minor adjustment in operation. As seen in FIG. 9, the filler means 57 may also include a stack of adjacent short ringlike members of laterally yieldable, smoothly surfaced material, a class which includes neoprene hosing, and serves to cushion a load and to compensate for minor adjustments of the direction turning means and travels a loaded hook means 51 smoothly over the curved length 20.

The individual links of the flexible lengths 20 or direction changing means each include connector means to interconnect the links, which means constitute driving connection connector means and which are designated generally by the numeral 59 in FIG. 4. With respect to FIGS. 5, 6, 7 and 8, the connector means 59 will now be described; and in these figures common parts are designated by similar numerals for brevity of description. The connector means 59 constitutes on each link an extending protrusion 61 having a portion 63 extending from the surface 64 of the link which confronts the adjacent link at a surface which faces in the path of the spiral run and which extending portion terminates in a distal portion 65 to be received in a companionately shaped recess 66 in the adjacent link. The recess 66 and the distal end portion 65 are configured so as to constitute mutually interengaging link means, preferably of the hook type seen in FIGS. 5 and 6, and the same may include a separate element, such as the cotter pin type of FIG. 8 or a simple pin and socket driving connection means of FIG. 7.

The mutually interengaging means which are oriented with the spiral run, as opposed to axially extending, it is seen do not in any way involve the article pushing face 40 and significantly the connections permit lateral bending of adjustment in operation by reason of the fact that the distal portions 65, although mating with the recesses 66, are foreshortened with respect to the companion or associated recess so as to present an enlarged receiving socket providing for a limited range of universal movement.

The axial lengths of the links of the direction changing means 20 are preferably sized lengthwise so as to trace less than two convolutions about the core to provide for a relatively tight turn, either a horizontal turn as in a corner or a vertical turn as moving from one level to another level. Additionally, the number of spiral convolutions of the links is preferably more than one, and in the preferred embodiment the successive connections of the links are not on the same side of the direction changing means 20, but, rather, staggered in relation about the surface of the flexible length. To this end each of the links is preferably greater than one spiral convolution and less than two and in the preferred embodiment between 1¼ and 1½ convolutions, in which preferred embodiment it has been found that the links are of a short enough axial length so that there is sufficient flexibility while resulting in smoothness of operation when the interconnecting means for the links are on opposite sides or staggered about the axis of rotation.

Coupling means are provided to interconnect the straight lengths and the curved lengths and will now be described. An adapter 73 comprising a sleeve is provided which is sized for receipt in the recess 75 in the end of the inner core 34 and having an inner diameter 77 to snuggly receive the end 79 of the flexible inner core of the flexible length with the aforesaid elements at the end of the straight lengths being secured together as by the pin means 80 seen in FIG. 4.

It is thus seen that there has been provided an inexpensive conveyor means which is adapted to travel load-bearing, hook-type carriers between adjacent stations and which are in a generally circuitous path involving either corners or separate levels. Although several embodiments have been shown, the connector means seen in FIG. 4 is preferred for interconnecting the lengths as well as the links. With reference to FIG. 4, as well as FIGS. 5, 6, 7 and 8, it is seen that the means to connect the individual links each project in the direction of the spiral path and between the sidewalls of the track so as not to interfere with the operating of the push face of the track in operation. This is to be contrasted with the heretofore attempted means to connect links at a curved conveyor section in which the axially extending faces of the links are provided with a plurality of projecting members to interconnect with an adjacent link and the inherent problem in such a structure of the fact that by reason of the depth of the groove at least one of the axially facing members is weakened by the resultant reduction in cross-sectional area seriously reducing the torque transmitting capacity of such a conveyor.

What I claim is:

1. For use in an axially rotatable delivery conveyor system including means to rotatably support said conveyor comprising spaced bearing elements, each of a predetermined axial length, the improvement which resides in:

at least first and a second conveyor lengths, said lengths each having a cocylindrical outer surface, coupling means interconnecting said lengths in a driving connection;

each of said lengths including, an inner core of rigid material, and article pushing means and bearing engaging means axially positioned and circumposed about the core, said bearing engaging means including said outer surface and said surface being smooth, substantially continuous and coaxial with the axis of said conveyor, and said article pushing means comprising a spiral track in said outer surface, said track including a substantially radially extending face between the inner core and said outer surface, said axially rotatable delivery conveyor including a curved length intermediate said first and second conveyor lengths, and coupling means interconnecting said lengths in a driving connection, said curved length including a flexible inner torque shaft and a plurality of interconnected generally coaxial outer links jacketing the torque shaft, each of said links comprising a structure having substantially the same surface configuration as that of the article pushing means and bearing engaging means of said first and second straight conveyor lengths, and means interconnecting said links, each of said last mentioned interconnecting means including a portion extending from one of the links in the direction of the spiral track and intermediate the adjacent article pushing means circumposed about the core and into engagement with the adjacent confronting link face.

2. The improvement as set forth in claim 1 wherein said substantially radially extending face between the inner core and said outer surface is at an angle of about at least 90° with respect to said outer surface.

3. The improvement as set forth in claim 1 wherein said spaced bearing elements comprise an upper and a lower conveyor engaging portion and structure interconnecting said portions and laterally spaced from the run of said conveyor and means to connect said bearing to a support surface.

4. The improvement as set forth in claim 1 wherein each of said links is of a length greater than one convolution of the spiral track and less than two convolutions.

5. The improvement as set forth in claim 4 wherein the axial length of the links jacketing the torque shaft extend axially about 1¼ convolutions of said spiral tank.

6. The improvement as set forth in claim 1 wherein said means to interconnect said links includes hook means, and said recess is enlarged relative to said extending portion.

7. The improvement as set forth in claim 6 wherein said hook means includes a pair of interconnected L-shaped members.

8. The improvement as set forth in claim 1 wherein said means to interconnect said links includes a pin extending generally in the direction of the spiral track and said recess is enlarged relative to the pin extending therein.

9. The improvement as set forth in claim 8 wherein said pin comprises a cutter pin and said means to interconnect said links includes a second recess in alignment with said recess in the adjacent confronting link face to receive said cutter pin.